(12) United States Patent
Goto

(10) Patent No.: US 6,735,366 B2
(45) Date of Patent: May 11, 2004

(54) OPTICAL WAVEGUIDE MODULE

(75) Inventor: Akio Goto, Tokyo (JP)

(73) Assignee: NEC Corporation, Tokyo (JP)

( * ) Notice: Subject to any disclaimer, the term of this patent is extended or adjusted under 35 U.S.C. 154(b) by 147 days.

(21) Appl. No.: 09/739,639

(22) Filed: Dec. 20, 2000

(65) Prior Publication Data
US 2003/0198441 A1 Oct. 23, 2003

(30) Foreign Application Priority Data
Dec. 21, 1999 (JP) .......................................... 11-362141

(51) Int. Cl.[7] ................................................ G02B 6/30
(52) U.S. Cl. ........................... 385/49; 385/39; 385/50; 372/6
(58) Field of Search ............................... 385/49, 50, 39; 372/6

(56) References Cited

U.S. PATENT DOCUMENTS 6,170,996 B1 * 1/2001 Miura et al. .................. 385/94
6,350,064 B2 * 2/2002 Mitsuda et al. ............... 385/49

FOREIGN PATENT DOCUMENTS

| JP | 02-073208 | 3/1990 |
|----|-----------|--------|
| JP | 08-018163 | 1/1996 |
| JP | 8-43651   | 2/1996 |
| JP | 10-54917  | 2/1998 |
| JP | 10-123371 | 5/1998 |
| JP | 10-126000 | 5/1998 |
| JP | 11-248978 | 9/1999 |

OTHER PUBLICATIONS

Japanese Office Action with English translation of pertinent portion, dated Jan. 7, 2003.

* cited by examiner

Primary Examiner—Tarifur R. Chowdhury
Assistant Examiner—George Y. Wang
(74) Attorney, Agent, or Firm—Whitham, Curtis & Christofferson, PC

(57) ABSTRACT

An optical waveguide module in which transmitted signal light emitted from a laser light-emitting element 4 passes through a first optical waveguide 3a and a second optical waveguide 3b to strike a transmitting/receiving medium 5 such as an optical fiber, and a signal light from the transmitting/receiving medium 5 passes through the second optical waveguide 3b and is received by a light-receiving element 7, the optical waveguide module comprising, a first light-blocking resin covering part 12, which covers a light-emitting coupling part 11a coupling the laser light-emitting element 4 and the first optical waveguide 3a, and a second light-block resin covering part 14, which covers a light-receiving coupling part 13a coupling the light-receiving element 7 and the second optical waveguide 3b.

6 Claims, 3 Drawing Sheets

OPTICAL WAVEGUIDE MODULE

BACKGROUND OF THE INVENTION

1. Field of the Invention

The present invention relates to an optical waveguide module, and more particularly to an optical waveguide module which has a semiconductor laser (laser diode), an optical waveguide that transmits a light signal from the laser diode to an optical fiber, and a photodiode that receives a light signal from the optical fiber via an optical waveguide.

2. Related Art

In recent years, communications means from trunk lines to subscribers is migrating from cables to optical communications at a rapid pace. Accompanying advancements in semiconductor technology, it has become possible to form a plurality of laser diode elements or photodiode elements on a single substrate, thereby facilitating the fabrication of optical components and optical communications equipment that can accommodate multiplexing. As a result, in order to achieve compactness and economy in optical modules used in optical subscriber systems, the mainstream approach has come to be one of using waveguides or the like to implement a transmitting/receiving module that integrates both a transmitting function and a receiving function (that is, an optical waveguide module).

While there are various types of optical waveguide modules, in a conventional optical transmitting/receiving module in which a transmitting photodiode is integrated with a receiving photodiode in a single optical module, the transmitted signal light of laser diodes that did not input to the optical waveguide acts as stray light that strikes a light-receiving photodiode, thereby becoming noise on the received signal light, which worsens the receiving sensitivity of the optical module.

In an optical module in which transmitting and receiving operations are performed by time division multiplexing, if a stray light that enters a light-receiving photodiode strikes a part other than the light-receiving surface of the photodiode, because the carrier diffusion time within the light-receiving photodiode is longer than the carrier diffusion time for carriers generated at the light-receiving surface, the noise has a long time constant, so that there is a worsening of receiving sensitivity immediately after switching from the transmitting operation to the receiving operation.

Because the laser diode stray light is guided as it experiences multiple reflections within the package, following a complex path of incidence before it strikes the photodiode, it is difficult to performing blocking so that stray light from the laser diode does not strike the Accordingly, it is an object of the present invention to provide an optical waveguide module having a simple configuration, which enables blocking of light from a semiconductor laser so that it does not strike a light-receiving element.

SUMMARY OF THE INVENTION

In order to achieve the above-noted objects, the present invention adopts the following basic technical constitution.

Specifically, a first aspect of the present invention is an optical waveguide module in which transmitted signal light emitted from a laser light-emitting element 4 passes through a first optical waveguide 3a and a second optical waveguide 3b to strike a transmitting/receiving medium 5 such as an optical fiber, and a signal light from the transmitting/receiving medium 5 passes through the second optical waveguide 3b and is received by a light-receiving element 7, the optical waveguide module comprising, a first light-blocking resin covering part 12, which covers a light-emitting coupling part 11a coupling the laser light-emitting element 4 and the first optical waveguide 3a, and a second light-block resin covering part 14, which covers a light-receiving coupling part 13a coupling the light-receiving element 7 and the second optical waveguide 3b.

In the second aspect of the present invention, the first and second light-blocking resin covering parts 12, 14 comprise a characteristic of either absorbing or reflecting light incident thereto.

In the third aspect of the present invention, the light-emitting coupling part 11a and the light-receiving coupling part 13a is filled with a transparent resin 11, 13, respectively.

In the fourth aspect of the present invention, the first light-blocking resin covering part 12 covers a monitoring light-receiving element 9 disposed at the rear part of the laser light-emitting element 4 and a monitoring light coupling part 11b coupling the laser light-emitting element 4 and the monitoring light-receiving element 9.

According to the above-noted configuration, of the transmitted signal light emitted from the laser light-emitting element, transmitted signal light that does not strike the first optical waveguide is blocked by the first light-blocking resin covering part, so that it does not leak to the outside. The light-receiving coupling parts are blocked by the second light-blocking resin covering part, thereby preventing the intrusion of externally introduced stray light into the light-receiving coupling parts. Therefore, because stray light from the laser light-emitting source does not find its way into the light-receiving element, noise caused by stray light does not occur, thereby preventing a worsening of the receiving sensitivity of the optical module.

In the fifth aspect of the present invention, a light-blocking plate 15, disposed above the first optical waveguide 3a, which blocks transmitted signal light 4a missing the light-emitting coupling part ha coupling the laser light-emitting element 4 and the first optical waveguide 3a.

BRIEF DESCRIPTIONS OF THE DRAWINGS

DETAILED DESCRIPTION OF THE PREFERRED EMBODIMENTS

Embodiments of the present invention are described in detail below, with references made to relevant accompanying drawings.

(First Embodiment)

Figure 1:
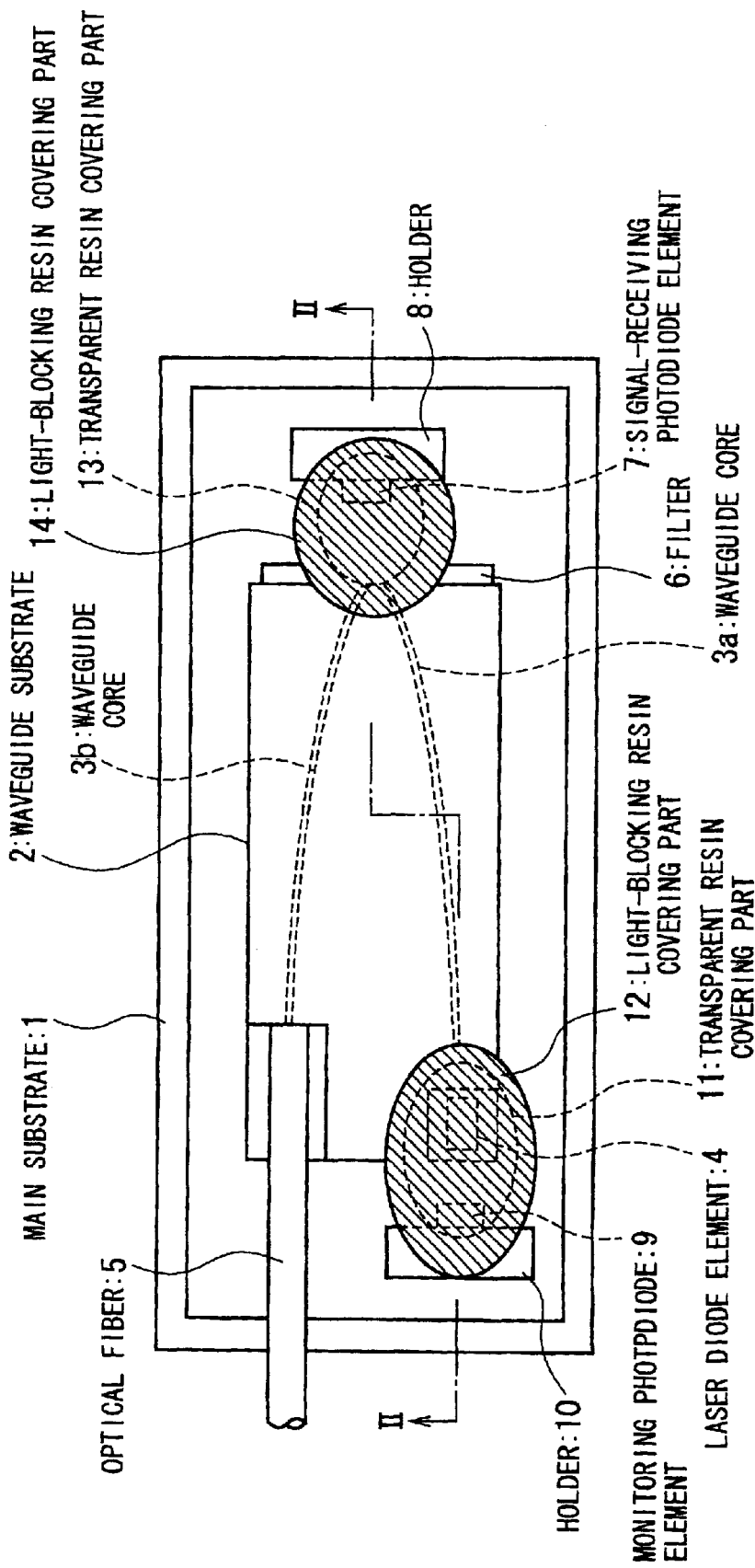
FIG. 1 is a plan view showing a first embodiment of an optical waveguide module according to the present invention.
Figure 2:
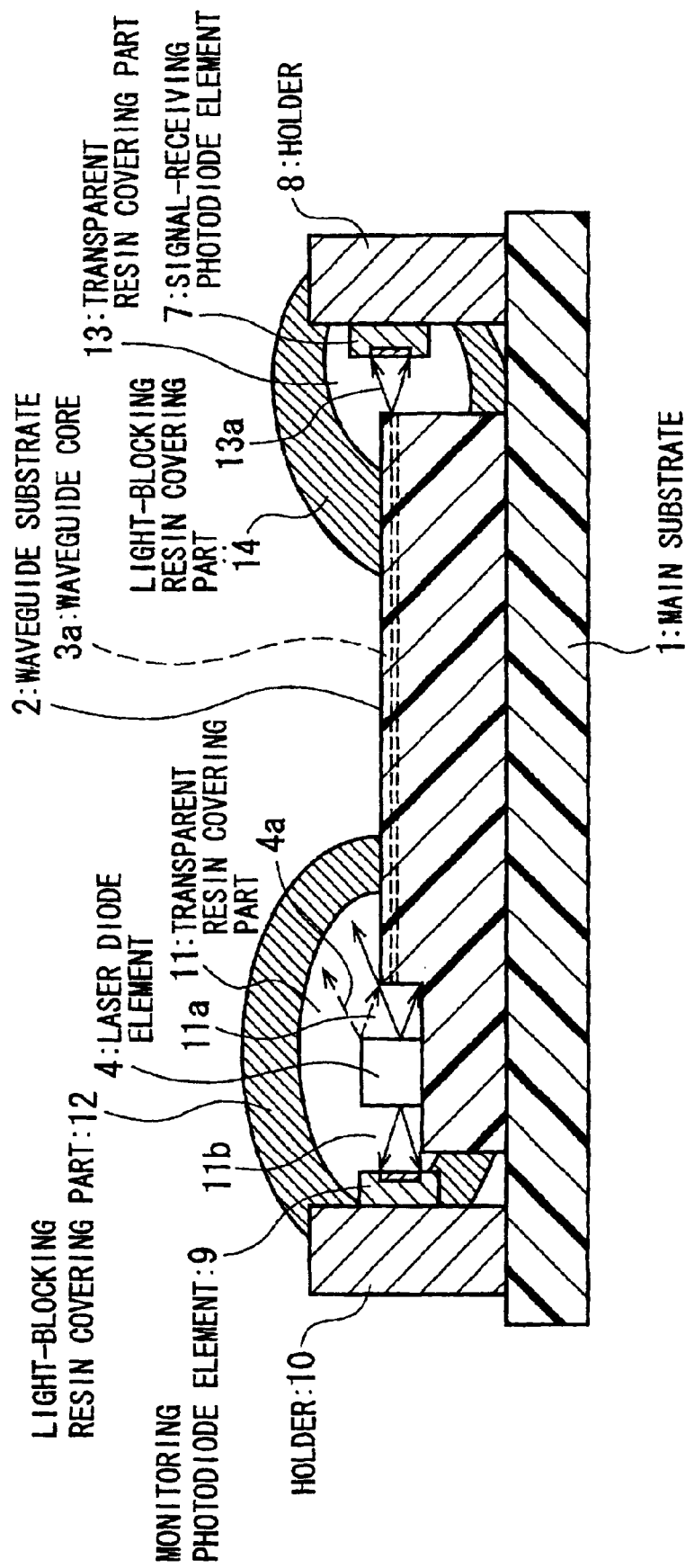
FIG. 2 is a cross-sectional view of the first embodiment of the present invention, along the cutting line II—II shown in FIG. 1.

Specifically, FIG. 1 shows the first embodiment of an optical waveguide type module according to the present invention, and FIG. 2 is a cross-sectional view thereof, along the cutting line II—II indicated in FIG. 1.

In the present module, a waveguide substrate 2 is provided on a main substrate 1, and waveguide cores 3a and 3b, which serve as optical waveguides, are formed as V shapes in the waveguide substrate 1. On one end face of the waveguide substrate 2 a laser diode 4 is mounted, with its light axis oriented in the axial direction of the waveguide core 3a. Furthermore, on one end face of the waveguide substrate 2 is disposed an optical fiber 5, which guides a light signal from the outside to the waveguide core 3b and which also transmits laser light from the waveguide core 3a to the outside. The optical fiber 5 is disposed within a groove (not shown in the drawing) formed on the waveguide substrate 2. On the other end face of the waveguide substrate 2 is an optical filter 6, which is in intimate contact with the waveguide cores 3a and 3b and which serves as a polarizing element. A light-receiving photodiode element 7 is provided opposite the optical filter 6 from the waveguide. The light-receiving photodiode element 7 is fixed to a holder 8 that is mounted upright on the main substrate 1. On the rear surface of the laser diode element 4 is disposed a monitoring photodiode element 9. The monitoring photodiode element 9 is fixed in the holder 10 mounted upright on the main substrate 1.

The adjacent region which surrounds the laser diode element 4 and the light-receiving part of the photodiode element 9 is coated with a transparent resin 11 in a dome shape, and the surface of this transparent resin 11 is covered by a light-blocking resin 12. In the same manner, the adjacent region which surrounds the optical filter 6 and the signal-receiving photodiode element 7 is coated with a transparent resin 13 in a dome shape, and the surface of the transparent resin 13 is covered with a light-blocking resin 14 The span and thickness of the transparent resin 11 are established so as not to impede the travel of laser diode light from the laser diode element 4 toward the waveguide core 3a and the monitoring photodiode element 9, and the span and thickness of the transparent resin 13 are established so as not to impede the travel of light from the waveguide core 3b toward the signal-receiving photodiode element 7.

In this manner, by providing the light-blocking resin 12, laser diode light that is not used for communication passes through the transparent resin 11, and then is either absorbed or reflected by the light-blocking resin 12, 50 that light emitted from the laser diode is not emanated to the outside from the light-blocking resin 12. In the signal-receiving photodiode element 7, because the region from the joining portions of the waveguide cores 3a and 3b up to the signal-receiving photodiode element 7 is coated with the light-blocking resin 14, light other than a received signal light does not strike the signal-receiving photodiode element 7. Therefore, because light that represents a noise component does not strike the signal-receiving photodiode element 7, enabling prevention of a decrease in receiving sensitivity.

The operation of the optical waveguide module shown in FIG. 1 and FIG. 2 is as follows.

When the laser diode element 4 is driven, generated laser diode light (signal light) enters the waveguide core 3a and is propagated through the waveguide core 3a. Having been propagated through the waveguide core 3a, the light signal is fully reflected at the optical filter 6 disposed at the coupling part of the waveguide cores 3a and 3b, and enters the waveguide core 3b, within which it is propagated. Because the light signal from the waveguide core 3a is completely reflected by the optical filter 6, it is not received by the signal-receiving photodiode element 7. The signal light having been propagated within the waveguide core 3b enters the optical fiber 5, and is thereby propagated to the outside. Light released from the rear surface of the laser diode element 4 passes through the transparent resin 11 and is received by the monitoring photodiode element 9, 50 as to monitoring the operating condition of the laser diode element 4. The signal light introduced to the optical fiber 5 from the outside strike the waveguide core 3b, passes through the optical filter 6, and is received by the signal-receiving photodiode element 7.

Of the laser diode light from the laser diode element 4, laser diode light 4a that does not strike the waveguide core 3a passes through the transparent resin 11 and attempts to leak in the direction of the signal-receiving photodiode element 7, but is blocked by the light-blocking resin 12.

At the signal-receiving photodiode element 7, because the transparent resin 13 is transparent, the signal light from the waveguide core 3b strikes the signal-receiving photodiode element 7 without hindrance. Because of the provision of the light-blocking resin 14, external light and light leaked from the laser diode element 4 is blocked, so that only the light signal from the waveguide core 3b is input to the signal-receiving photodiode element 7. For this reason, it is possible to prevent a reduction in the receiving sensitivity.

In a module in which the wavelengths of the transmitted light and the received light are changed, so as to achieve simultaneous receiving and transmitting, in the case in which part of the transmitted light from the laser diode element 4 enters the signal-receiving photodiode element 7, because this represents noise with respect to the received signal light, there is a worsening of the receiving characteristics of the module. The coupling efficiency (incidence efficiency) between the laser diode element 4 and the waveguide core 3a is only 50% at maximum, the remaining transmitted light not incident to the waveguide core 3a being released outside of the waveguide core 3a, thereby becoming stray light which undergoes multiple reflections within the package of the module. If this stray light enters the signal-receiving photodiode element 7, there is a deterioration of receiving characteristics.

According to the present invention shown in FIG. 1 and FIG. 2, however, the signal light from the laser diode element 4 is propagated within the transparent resin 11 and enters the waveguide core 3a. When this occurs, light that did not enter the waveguide core 3a and light reflected at the end face of the waveguide core 3a is propagated within the transparent resin 11, after which it is absorbed or reflected by the light-blocking resin 12, so that it is not released outside of the light-blocking resin 12, the result being that there is no stray light occurring which undergoes multiple reflections within the package. Therefore, the light emitted from the laser diode element 4 does not enter the signal-receiving photodiode element 7.

The rear light of the laser diode element 4 also propagates within the transparent resin 11 and strikes the monitoring photodiode element 9. When this occurs, light that does not strike the monitoring photodiode element 9 and light that is reflected at the light-receiving surface of the monitoring photodiode element 9 propagates within the transparent resin 11 and reaches the light-blocking resin 12, whereupon it is either absorbed or reflected by the light-blocking resin 12, so that it is not released outside the light-blocking resin 12.

In the configuration shown in FIG. 1 and FIG. 2, while two light-blocking resin covering parts 12 and 14 are provided, it will be understood that it is possible to provide either of these as a single light-blocking resin covering part. Additionally, although the waveguide cores 3a and 3b use V-shaped couplings and the waveguide core 3b serves for both transmitting and receiving, it will be understood that it is alternatively possible to have an optical waveguide module in which the waveguide core 3b is used for receiving only, and in which an optical fiber separate from the optical fiber 5 is directly couple to the waveguide core 3a.

(Second Embodiment)

Figure 3:
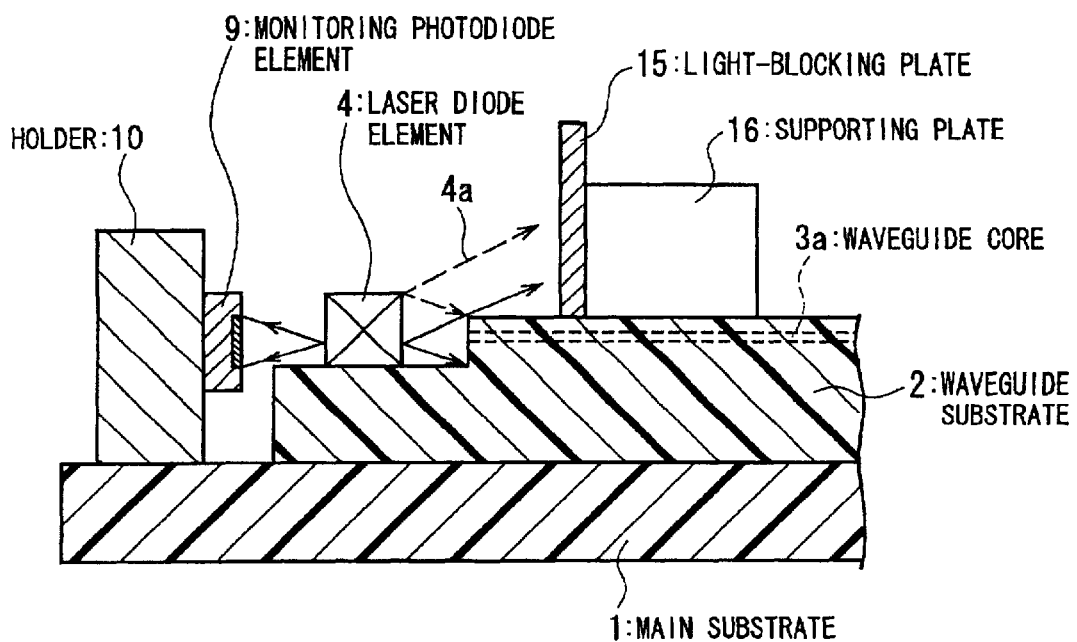
FIG. 3 is plan view showing a second embodiment of an optical waveguide module according to the present invention.

FIG. 3 shows a second embodiment of an optical waveguide module according to the present invention.

In this embodiment, in place of the light-blocking resin 12 used in the first embodiment, a light-blocking plate 15 is provided as an upright barrier on the optical waveguide substrate at the front side of the laser diode element 4. The light-blocking resin 14 on the signal-receiving photodiode element 7 is provided the same as in the first embodiment.

The light-blocking plate 15 has the characteristic of either absorbing or reflecting light incident thereto. The means for achieving this is to apply to the light-blocking plate 15 a resin that either absorbs or reflects light from the laser diode element 4. By doing this, laser diode from the laser diode element 4 that did not enter the waveguide core 3a is either absorbed or reflected by the light-blocking plate 15, 50 that a stray light component does not strike the signal-receiving photodiode element 7. Therefore, in the same manner as in the first embodiment, it is possible to prevent a reduction in the receiving sensitivity.

In the second embodiment, in place of the light-blocking plate 15, it is possible to apply a thick layer of the same material as the light-blocking resins 12 and 14 used in the first embodiment. By doing this, light that would find its way from the laser diode element 4 to the signal-receiving photodiode 7 is blocked, thereby achieving the same effect as the first embodiment of the present invention. In this case, the application thickness (or height) is established as a value at which stray light that reaches the signal-receiving photodiode element 7 does not occur.

As described in detail above, according to an optical waveguide module of the present invention, because light of the transmitted signal light generated from a laser diode element that misses a light-emission coupling part is blocked by a first light-blocking resin, and because a second light-blocking resin covers the light-receiving coupling part of the second optical waveguide and a light-receiving element, stray light does not reach the light-receiving element, and at the light-receiving coupling part as well, because stray light from the outside is not permitted to intrude, noise attributed to stray light does not occur, thereby enabling prevention of a reduction in the receiving sensitivity attributed to stray light propagated within the package. Additionally, because the light-blocking resin covering part is formed by application of a resin, it is easy to fabricate and low in cost.

Additionally, because a light-blocking plate is positioned above the first optical waveguide so as to block transmitted signal light that misses the light-emitting coupling part of the laser light-emitting element and the first optical waveguide, it is possible to prevent stray light from finding its way to the light-receiving element, thereby preventing the occurrence of noise attributed to stray light, which enables prevention of a reduction in the receiving sensitivity.

What is claimed is:

1. An optical waveguide module in which transmitted light emitted from a laser light-emitting element passes through a first optical waveguide and a second optical waveguide to strike a transmitting/receiving medium which is used for transmitting and receiving light, and in which a signal light from said transmitting/receiving medium passes through said second optical waveguide and is received by a light-receiving element, said optical waveguide module comprising:

a first light-blocking resin, which covers a light-emitting coupling part that couples said laser light-emitting element and said first optical waveguide, and a second light-blocking resin, which covers a light-receiving coupling part that couples said light receiving element and said second optical waveguide;

wherein the first and second optical waveguides are integrated optical waveguides disposed on a waveguide substrate, and wherein the light-emitting element and light-receiving element are disposed on opposite sides of the waveguide substrate.

2. The optical waveguide module according to claim 1, wherein said first and second light-blocking resins comprise a characteristic of either absorbing or reflecting light incident thereto.

3. The optical waveguide module according to claim 1, wherein said light-emitting coupling part and said light-receiving coupling part are filled with a transparent resin.

4. The optical waveguide module according to claim 1, wherein said first light-blocking resin covers a monitoring light-receiving element disposed at a rear of said laser light-emitting element, and wherein the monitoring light-receiving element is coupled to said laser light-emitting element.

5. An optical waveguide module in which transmitted light emitted from a laser light-emitting element passes through a first optical waveguide and a second optical waveguide to strike a transmitting/receiving medium which is used for transmitting and receiving light, and in which a signal light from said transmitting/receiving medium passes through said second optical waveguide and is received by a light-receiving element, wherein the first and second optical waveguides are integrated waveguides disposed on a waveguide substrate, said optical waveguide module comprising:

a light-blocking plate, disposed above said first optical waveguide and not intercepting a core of said waveguide, which blocks transmitted light missing said light-emitting coupling part that couples said laser light-emitting element and said first optical waveguide, wherein the light-emitting element and light-receiving element are disposed on opposite sides of said light-blocking plate.

6. The optical waveguide module according to claim 5, wherein said light-blocking plate comprises a characteristic of either absorbing or reflecting light incident thereto.

* * * * *